US007900945B1

(12) United States Patent
Rackley

(10) Patent No.: US 7,900,945 B1
(45) Date of Patent: Mar. 8, 2011

(54) ALL-TERRAIN WHEELCHAIR

(75) Inventor: John W. Rackley, Eliot, ME (US)

(73) Assignee: Renegade Wheelchairs, LLC, South Portland, ME (US)

( * ) Notice: Subject to any disclaimer, the term of this patent is extended or adjusted under 35 U.S.C. 154(b) by 135 days.

(21) Appl. No.: 12/260,271

(22) Filed: Oct. 29, 2008

Related U.S. Application Data

(60) Provisional application No. 60/983,787, filed on Oct. 30, 2007.

(51) Int. Cl.
*B62M 1/04* (2006.01)

(52) U.S. Cl. ...................... 280/244; 280/250.1; 280/250; 280/248

(58) Field of Classification Search .................. 280/244, 280/248, 250, 250.1
See application file for complete search history.

(56) References Cited

U.S. PATENT DOCUMENTS 3,709,556 A * 1/1973 Allard et al. ............... 297/188.2
3,994,509 A * 11/1976 Schaeffer ................... 280/250.1
4,595,212 A * 6/1986 Haury et al. ............... 280/250.1
4,811,964 A * 3/1989 Horn .......................... 280/250.1
4,865,344 A * 9/1989 Romero et al. ............... 280/255
5,374,074 A * 12/1994 Smith ........................ 280/304.1
5,632,499 A * 5/1997 Hutcherson et al. .......... 280/246
5,865,455 A * 2/1999 Taylor ........................ 280/250.1
6,234,504 B1 * 5/2001 Taylor ........................ 280/250.1
6,390,426 B1 * 5/2002 Berry ......................... 248/230.1
6,715,780 B2 * 4/2004 Schaeffer et al. ............ 280/248
6,820,885 B1 * 11/2004 Oshimo ........................ 280/243
D504,933 S * 5/2005 Hopwood .................... D22/147
7,344,146 B2 * 3/2008 Taylor .......................... 280/246
7,647,873 B1 * 1/2010 Elflein ..................... 108/158.11
2007/0013158 A1 * 1/2007 Loniello .................. 280/87.021
2008/0073869 A1 * 3/2008 Patterson ...................... 280/244
2008/0238022 A1 * 10/2008 Kylstra et al. ................. 280/244
2008/0309051 A1 * 12/2008 Elflein ....................... 280/304.1
2009/0295119 A1 * 12/2009 Bloswich et al. .......... 280/250.1

* cited by examiner

*Primary Examiner* — Joanne Silbermann
*Assistant Examiner* — Michael R Stabley
(74) *Attorney, Agent, or Firm* — Verrill Dana, LLP; Chris A. Caseiro

(57) ABSTRACT

An all-terrain wheelchair including independently operable right and left push bars arranged to enable individuals of varied physical strength to move the chair along a wide range of terrains, including soft terrain. The push bars allow the user to establish mobility without hand to wheel interaction. The all-terrain wheelchair allows the user to propel the chair forward with a forward motion of the push bars while pulling back on the push bars engages a braking system. Turning is achieved with a forward motion on one push bar and a backward motion on the other push bar. The all-terrain wheelchair of the present invention offers the user a multi-speed geared advantage over traditional wheelchairs. Shifting into lower gears for snow, mud, and sand, gives the user the freedom to go where they have not been able to go with traditional wheelchairs. The push bars are removable and may be stored so that the wheelchair may be moved using conventional hand-to-wheel pushing.

16 Claims, 6 Drawing Sheets

ALL-TERRAIN WHEELCHAIR

CROSS REFERENCE TO RELATED APPLICATION

The present application claims the priority benefit of U.S. provisional patent application Ser. No. 60/983,787, filed Oct. 30, 2007, entitled "ALL-TERRAIN WHEELCHAIR" of the same named inventor. The entire contents of that prior application are incorporated herein by reference.

BACKGROUND OF THE INVENTION

1. Field of the Invention

This invention relates to wheelchairs. More particularly, the present invention relates to wheelchairs suitable for use over a range of terrain conditions.

2. Description of the Prior Art

Individuals constrained to move in wheelchairs often run into obstacles in getting to locations of interest that may be inconvenient, but not restrictive, to others. While certain statutory obligations have eased accessibility restrictions in regard to buildings, walkways and the like, there remain many locations, particularly related to the outdoors, where individuals continue to experience impediments. In fact, there are a wide variety of terrains and conditions that are typically prohibitive to users of conventional wheelchairs and power chairs—especially outdoor environments and elements e.g. forest floors, hilly and rough terrain, ice, snow, mud, and sand. In general, soft terrain can be particularly difficult to manage.

In addition to the limitations of movement associated with outdoor activities, there remain manmade obstacles that either bar access or render the process of access excessively cumbersome. For example, there remain daily manmade obstacles such as curbs and high thresholds. Further, for those individuals without substantial upper body strength and without powered chairs, an array of imposing terrain conditions restrict access to areas of interest. Those without power chairs must move their chairs by placing hand to wheel to cause wheel rotation. Over long trips that can be physically exhausting. Over messy terrain, such as snow, puddles and mud, it can be very messy.

Therefore, what is needed is a wheelchair suitable for use by a broad range of individuals over a wide range of terrain conditions including, but not limited to, outdoor natural terrain.

SUMMARY OF THE INVENTION

The present invention overcomes the limitations associated with existing wheelchairs. In particular, the present invention is an all-terrain wheelchair that is a geared device including push-bar structures to enable individuals of varied physical strength to move the chair along a wide range of terrains, including soft terrain. The push-bars allow the user to establish mobility without hand to wheel interaction. The unique design propels the user forward with a forward motion of the push-bars while pulling back on the push-bars engages a braking system. Turning is achieved with a forward motion on one push-bar and a backward motion on the other push-bar.

The all-terrain chair of the present invention offers the user a multi-speed geared advantage over traditional wheelchairs. Shifting into lower gears for snow, mud, and sand, gives the user the freedom to go where they have not been able to go with traditional wheelchairs. Simply shifting into higher gears allows for movement on pavement and other hard surfaces. The push-bars are removable and may therefore be stored so that the chair may be moved using conventional hand-to-wheel pushing.

The all-terrain chair allows the user to manage a wide variety of terrains and conditions that are typically prohibitive to users of conventional wheelchairs and power chairs—especially outdoor environments and elements e.g. forest floors, hilly and rough terrain, ice, snow, mud, and sand. Further, it can be used to overcome many daily obstacles such as curbs and high thresholds. It is advantageous for individuals less upper body and arm strength and function. As a result, it provides for greater, independent participation in outdoor activities such as hiking, hunting, fishing, camping, backpacking, and outdoor photography.

These and other advantages will become apparent upon review of the following detailed description and the accompanying drawings.

DETAILED DESCRIPTION OF THE PREFERRED EMBODIMENT OF THE INVENTION

Figure 1:
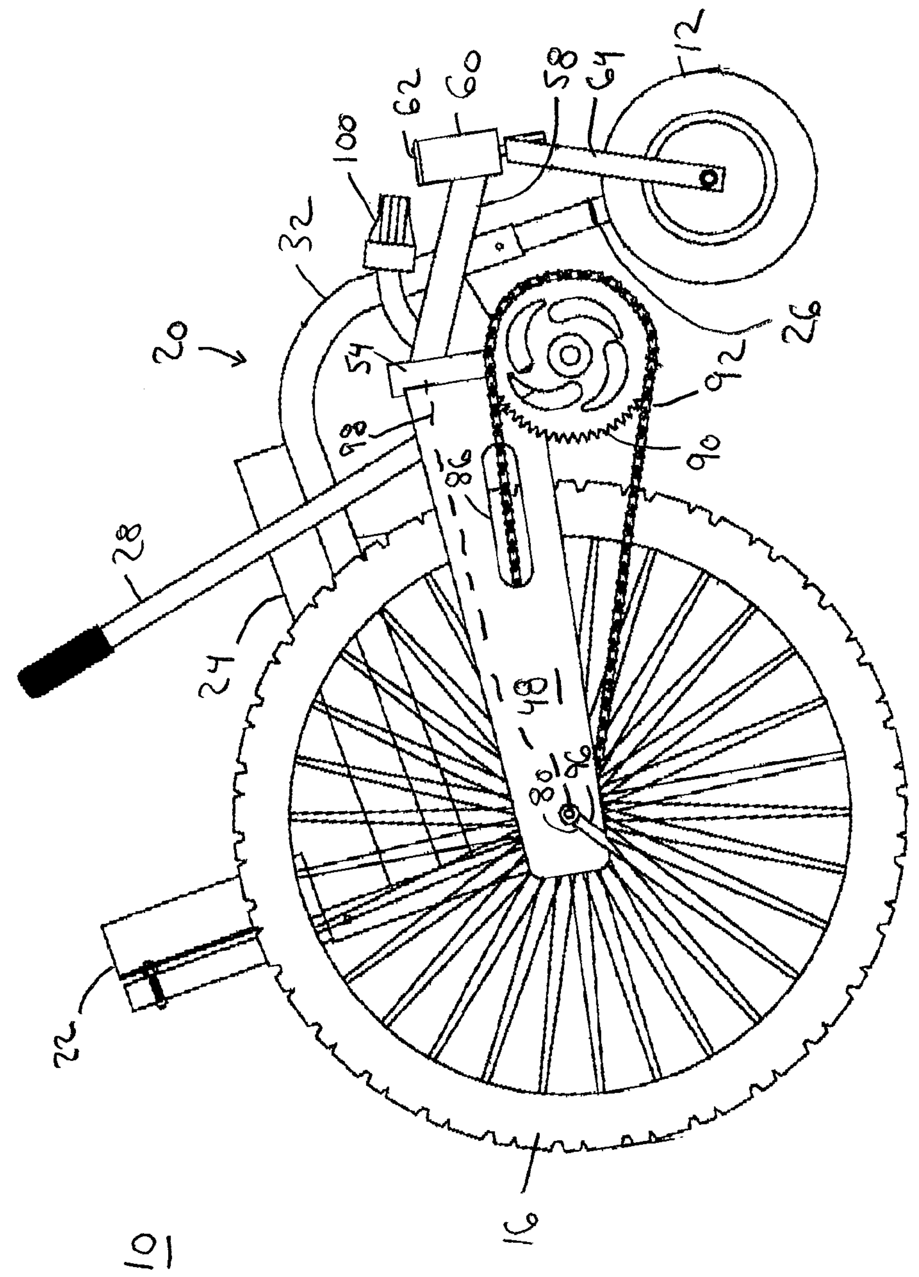
FIG. 1 is a right side view of the all-terrain wheelchair of the present invention.

An all-terrain wheelchair 10 of the present invention is shown in FIGS. 1-6. The wheelchair 10 includes right and left front wheels 12 and 14, right and left rear wheels 16 and 18, a primary structural frame 20, a back rest 22, a seat 24 and a foot rest 26. The wheelchair 10 also includes a removable right push bar 28 and a removable left push bar 30. The front wheels 12 and 14 are pneumatic or other suitable tires and are sized smaller than the rear wheels 16 and 18. The rear wheels 16 and 18 may also be pneumatic or other suitable tires and make be mounted on spoked rims. The wheelchair 10 is configured to allow the user to generate forward movement using the push bars 28 and 30 rather than through direct hand contact with the rear wheels 16 and 18. The push bars 28 and 30 are coupled to the rear wheels 16 and 18 through independent sprocket-and-chain arrangements configured to enable the user to gain leverage suitable for moving the wheelchair 10 across uneven terrain and through a range of ground surface conditions including mud and snow, for example.

The primary structural frame 20 includes a first primary frame bar 32, a second primary frame bar 34, a first primary cross bar 36 and a second primary cross bar 38. The components of the primary structural frame 20 are preferably fabricated of a high strength, lightweight, corrosion resistant material. Coated aluminum or stainless steel tubing is suitable for this purpose, although the primary structural frame 20 is not limited to fabrication of such materials. The first primary frame bar 32 and the second primary frame bar 34 are curved from a horizontal orientation to a vertical orientation from back to front of the wheelchair 10. The horizontal portions of the pair of primary frame bars 32/34 are configured to support the seat 24 thereon. The first primary cross bar 36 and the second primary cross bar 38 are connected to the first primary frame bar 32 and the second primary frame bar 34 by stanchions 40 and are further joined together by accessory tube 41. All components of the primary structural frame 20 may be joined together permanently, such as by welding. Alternatively, some or all of those components may be removably connected together.

The first primary cross bar 36 and the second primary cross bar 38 are also coupled to a right rear wheel frame 42 and a left rear wheel frame 44. That coupling may be a permanent connection, such as by welding, or it may be a removable coupling. The right rear wheel frame 42 and the left rear wheel frame 44 have a general wishbone configuration but they are not specifically required to be so arranged. The right rear wheel frame 42 includes an inside plate 46 and an outside plate 48. The left rear wheel frame 44 includes an inside plate 50 and an outside plate 52. In the embodiment of the wheelchair 10 described herein, the inside plate 46 of the right rear wheel frame 42 has a design equivalent to that of the outside plate 52 of the left rear wheel frame 44, and the outside plate 48 of the right rear wheel frame 42 has a design equivalent to that of the inside plate 50 of the left rear wheel frame 44. The invention is not limited thereto. The inside plate 46 of the right rear wheel frame 42 and the inside plate 50 of the left rear wheel frame 44 are both coupled to the first primary cross bar 36 and the second primary cross bar 38, either permanently or removably.

The right rear wheel frame 42 includes a primary attachment bar 54 that joins the inside plate 46 and the outside plate 48 together. The primary attachment bar 54 of the right rear wheel frame 42 is joined to right front sprocket bar 56, which extends substantially perpendicular from a bottom end of the primary attachment bar 54. A right front wheel coupling bar 58 extends downwardly at an angle from a top end of the primary attachment bar 54. The right front wheel coupling bar 58 terminates at and is joined to a right front wheel fork bearing tube 60. The right front wheel fork bearing tube 60 includes a port for receiving and releasably retaining therein a fork bolt 62 arranged to removably and rotatably join the primary attachment bar 54 to a right front wheel fork 64. The right front wheel fork 64 is arranged to receive and retain the right front wheel 12 in a manner that allows its pivotal movement upon turning of the wheelchair 10 in a left or right direction. The right front wheel fork 64 completes the coupling of the right front wheel 12 to the primary structural frame 20 of the wheelchair 10 through the right rear wheel frame 42.

The left rear wheel frame 44 includes a primary attachment bar 66 that joins the inside plate 50 and the outside plate 52 together. The primary attachment bar 66 of the left rear wheel frame 44 is joined to left front sprocket bar 68, which extends substantially perpendicular from a bottom end of the primary attachment bar 66. A left front wheel coupling bar 70 extends downwardly at an angle from a top end of the primary attachment bar 66. The left front wheel coupling bar 70 terminates at and is joined to a left front wheel fork bearing tube 72. The left front wheel fork bearing tube 72 includes a port for receiving and releasably retaining therein a fork bolt 74 arranged to removably and rotatably join the primary attachment bar 66 to a left front wheel fork 76. The left front wheel fork 76 is arranged to receive and retain the left front wheel 14 in a manner that allows its pivotal movement upon turning of the wheelchair 10 in a left or right direction. The left front wheel fork 76 completes the coupling of the left front wheel 14 to the primary structural frame 20 of the wheelchair 10.

The right rear wheel frame 42 is arranged to rotatably retain the right rear wheel 16 between the inside plate 46 and the outside plate 48. The inside plate 46 includes a first right wheel hub slot 78 and the outside plate 48 includes a second right wheel hub slot 80. Hub slots 78 and 80 are sized and arranged to enable insertion therein of a hub of the right rear wheel 16, in a configuration resembling that of the rear frame of a bicycle. Similarly, the left rear wheel frame 44 is arranged to rotatably retain the left rear wheel 18 between the inside plate 50 and the outside plate 52. The inside plate 50 includes a first left wheel hub slot 82 and the outside plate 52 includes a second left wheel hub slot 84. Hub slots 82 and 84 are sized and arranged to enable insertion therein of a hub of the left rear wheel 18, again, in a configuration resembling that of the rear frame of a bicycle.

The outside plate 48 of the right rear wheel frame 42 also includes a right chain slot 86. Similarly, the inside plate 50 of the left rear wheel frame 44 includes a left chain slot 88. The wheelchair 10 is configured so that the right push bar 28 may be actuated manually to move the right side wheels and the left push bar 30 may be actuated manually to move the left side wheels, so that the two sides may be moved in unison for straight ahead movement or they may be moved independent of one another to enable left turning (moving the right side only) or right turning (moving the left side only). Specifically, the user pushes the right push bar 28 forward and pulls the left push bar 30 backward to cause movement of the right side of the wheelchair 10 while the left side remains braked, causing leftward movement of the wheelchair 10. Similarly, the user pushes the left push bar 30 forward and pulls the right push bar 28 backward to cause movement of the left side of the wheelchair 10 while the right side remains braked, causing rightward movement of the wheelchair 10.

The flexibility of movement is achieved by having separate left and right actuation mechanisms. The right side mechanism includes the right push bar 28 coupled to right front sprocket bar 56, right front sprocket 90 coupled to the right push bar 28 through right front sprocket bar 56, right chain 92, and right internal hub gear 94 coupled to the right front sprocket 90 by right chain 92. The right push bar 28 is a shaft insertable into a tube. The right front sprocket bar 56 is a tube that includes a bearing therein to which the shaft of the right push bar 28 is removably connected. The right chain 92 passes from the outside of outside plate 48 of right rear wheel frame 42 to the inside thereof through right chain slot 86. The right rear hub gear 94 forms part of the hub of the right rear wheel 16 and is preferably a multi-gear but is not limited thereto. The right rear hub gear 94 also includes an associated drum brake. The position of the right rear hub gear 94, and therefore the gearing or leverage provided by the movement of the right push bar 28 is modified by right gear adjustment cable 98. The right gear adjustment cable 98 is modified by right gear shifter 100, which may be a rotatable index shifter, as shown. In operation, the user pushes the right push bar 28 forward, which causes forward rotation of the right front sprocket 90, corresponding forward rotation of the right chain 92 and the right rear hub gear 94, culminating in forward rotation of the right rear wheel 16.

The left side mechanism functions in a similar manner. It includes the left push bar 30 coupled to left front sprocket bar 68, left front sprocket 102 coupled to the left push bar 30 through left front sprocket bar 68, left chain 104, and left internal hub gear 106 coupled to the left front sprocket 102 by left chain 104. The left push bar 30 is a shaft insertable into a tube. The left front sprocket bar 68 is a tube that includes a bearing therein to which the shaft of the left push bar 30 is removably connected. The left chain 104 passes from the inside of inside plate 52 of left rear wheel frame 44 to the outside thereof through left chain slot 88. The left rear hub gear 106 forms part of the hub of the left rear wheel 18 and is preferably a multi-geared hub but is not limited thereto. The left rear hub gear 106 also includes an associated drum brake. The position of the left rear hub gear, and therefore the gearing or leverage provided by the movement of the left push bar 30 is modified by a left gear adjustment cable (not shown). The left gear adjustment cable is modified by a left gear shifter (not shown), which may be a rotatable index shifter, as shown. In operation, the user pushes the left push bar 30 forward, which causes forward rotation of the left front sprocket 102, corresponding forward rotation of the left chain 104 and the left rear hub gear 106, culminating in forward rotation of the left rear wheel 18. It is to be understood that the left gear adjustment cable and the left gear shifter are the same as the right gear adjustment cable 98 and the right gear shifter 100, but are simply not shown to aid in viewing of other components of the wheelchair 10.

Figure 2:
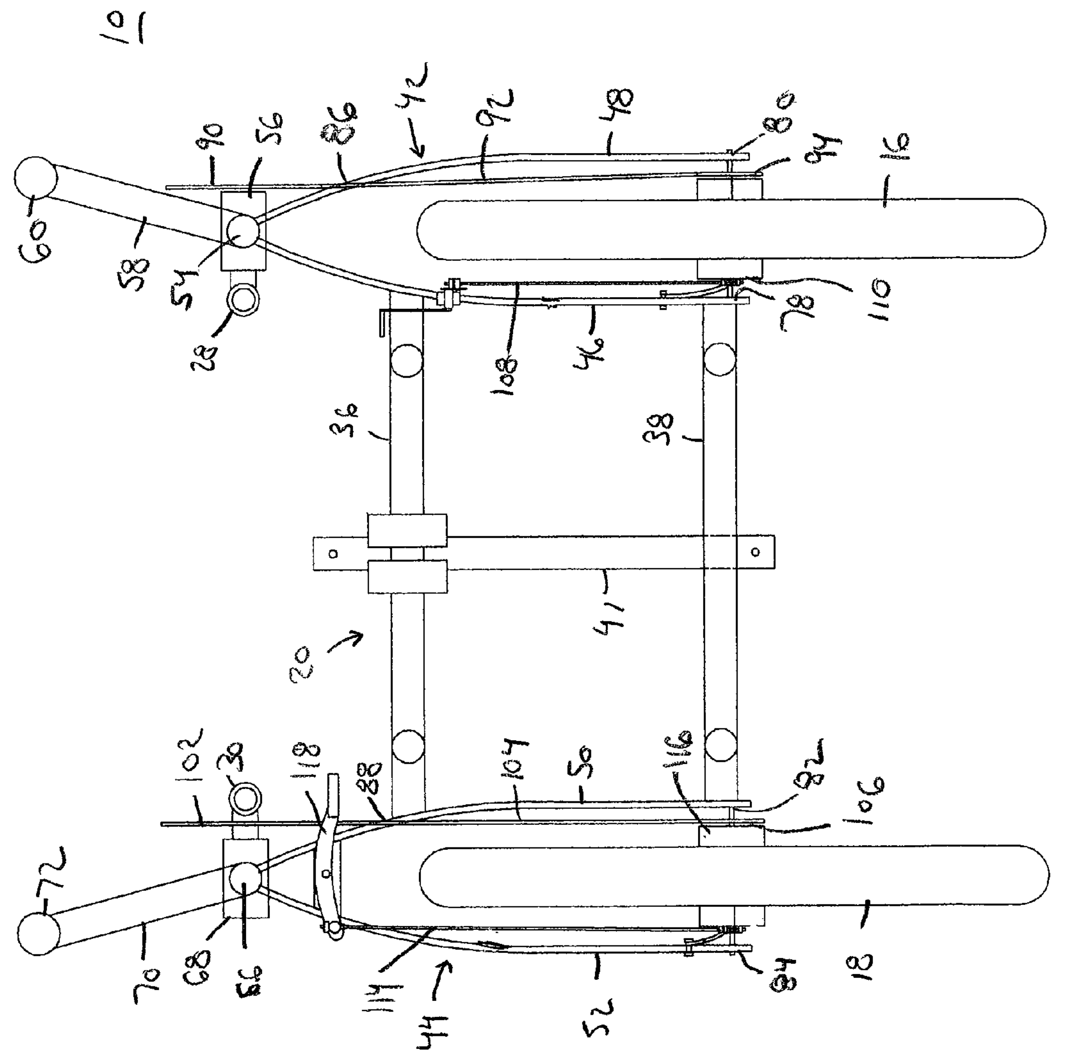
FIG. 2 is a top view looking down on the wheelchair with the seat and back removed.
Figure 3:
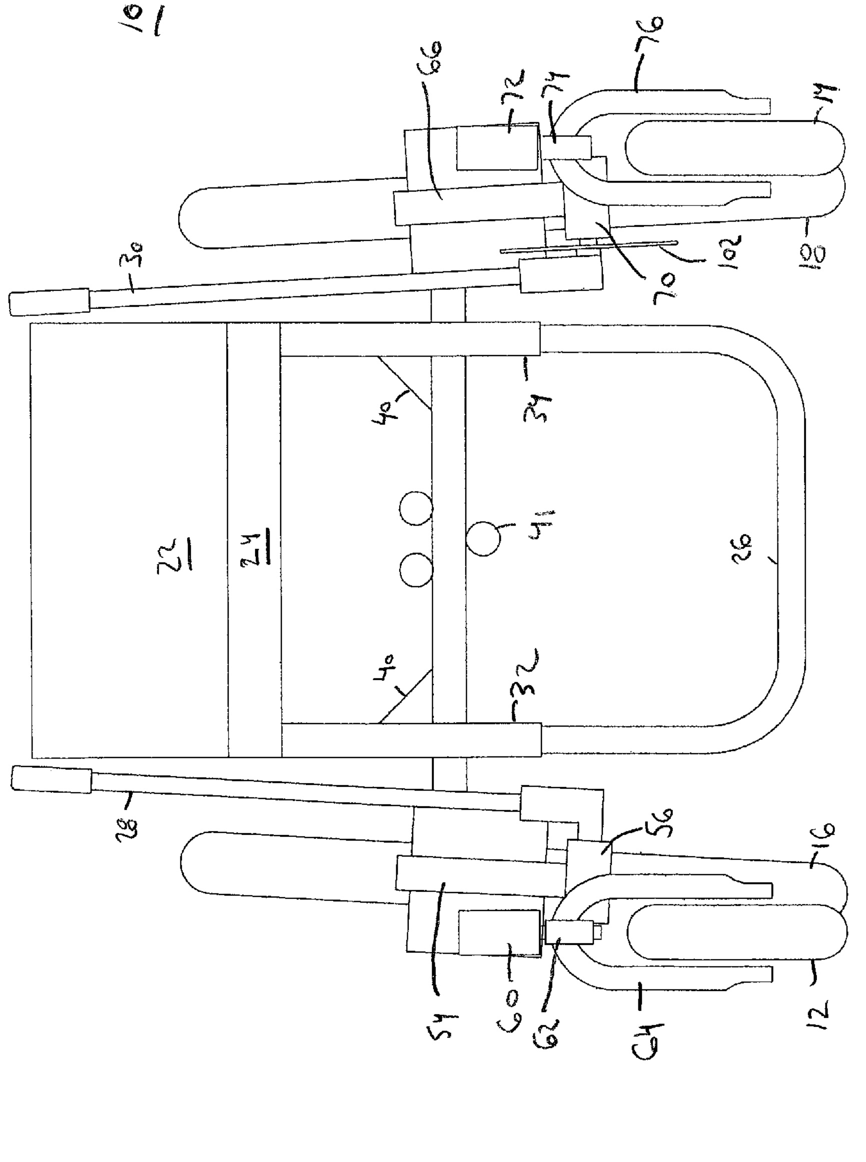
FIG. 3 is a front view of the wheelchair.
Figure 4:
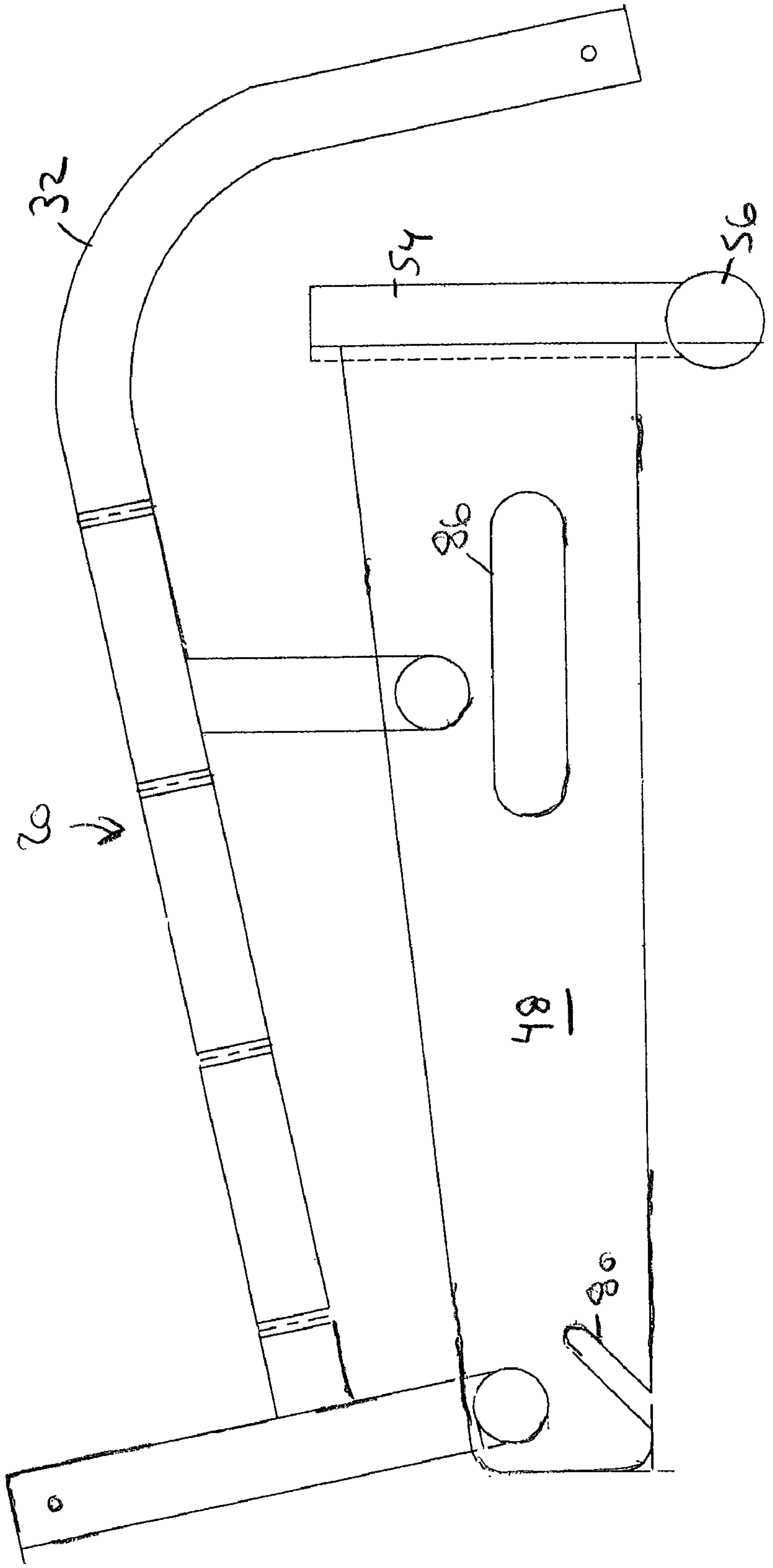
FIG. 4 is a side view of a portion of the right side of the wheelchair.
Figure 5:
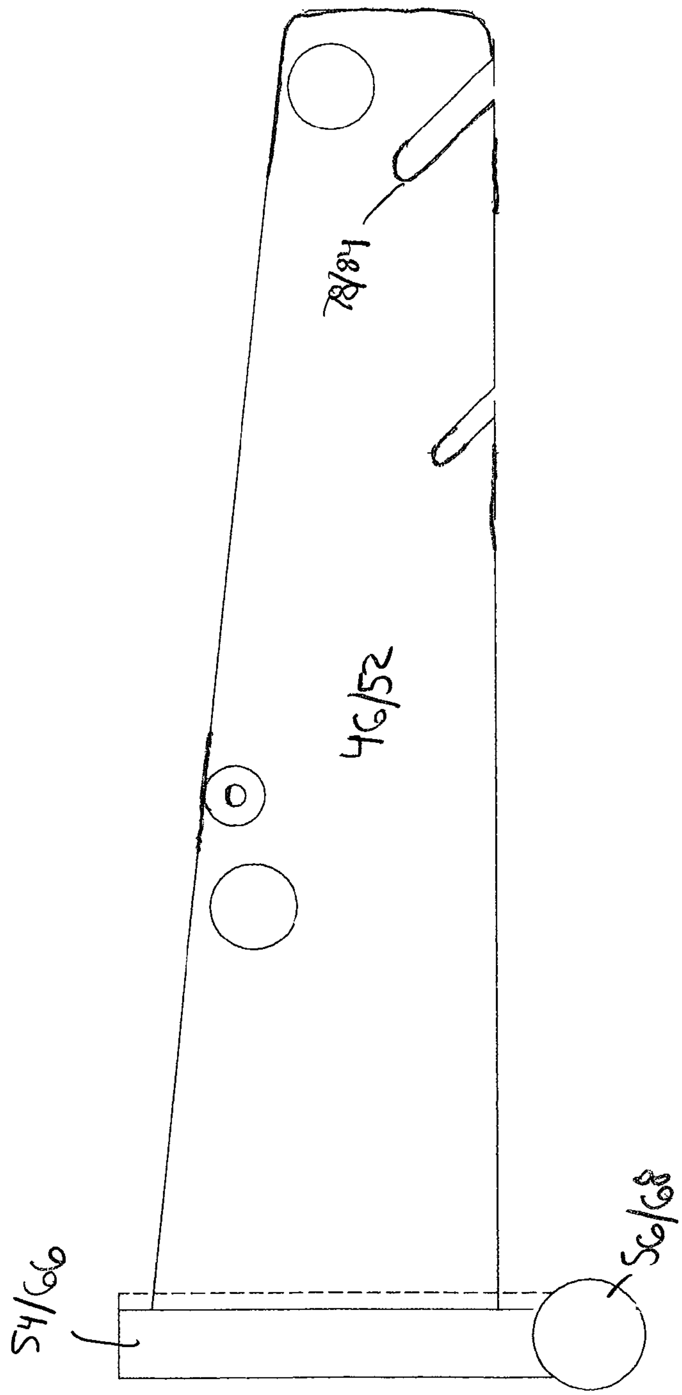
FIG. 5 is a side view of the frame that is the inside of the right side frame and the outside of the left side frame of the wheelchair.
Figure 6:
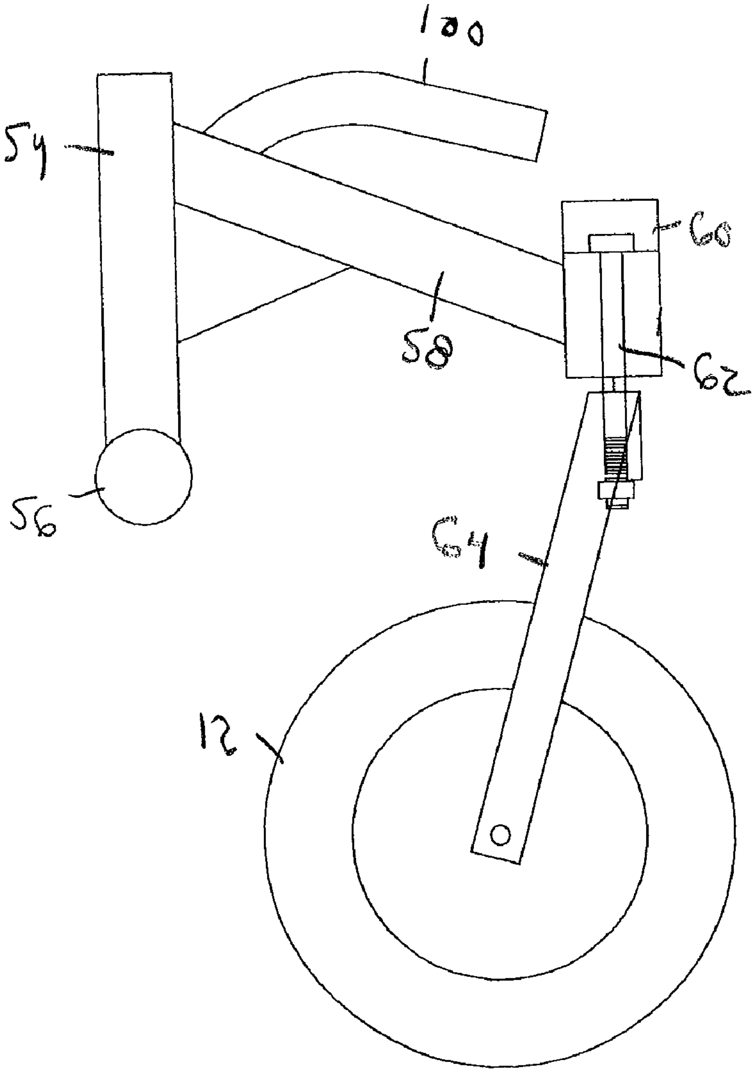
FIG. 6 is a side view of a portion of the right side of the wheelchair showing the front right wheel.

With continuing reference to FIGS. 2 and 3, the wheelchair 10 further includes a pair of brake rods associated with the respective ones of the right rear wheel 12 and the left rear wheel 14. Specifically, the right side of the wheelchair 10 includes a right brake rod 108 that is coupled to right rear hub 110 of the right rear wheel 16. The right brake rod 108 includes brake lever arm 112 that is coupled to the right push bar 28. When pulling back on the right push bar 28, the user actuates the brake lever arm 112, causing the right brake rod 108 to halt forward movement of right rear hub gear 94 and, therefore, forward movement of right rear wheel 16. Similarly, the left side of the wheelchair 10 includes a left brake rod 114 that is coupled to left rear hub 116 of the left rear wheel 18. The left brake rod 114 includes a brake lever arm (not shown) that is coupled to the left push bar 30 through left rocker arm 118. The right side of the wheelchair 10 has a similar rocker arm arrangement that is omitted only for the purpose of enabling the viewing of other components of the wheelchair 10. When pulling back on the left push bar 30, the user actuates the left side brake lever arm, causing the left brake rod 114 to halt forward movement of left rear hub gear 106 and, therefore, forward movement of left rear wheel 18.

The all-terrain wheelchair 10 of the present invention is propelled with two removable push bars, one located on each side of the wheelchair seat. The push bars are insertable into tubes that are in turn attached to shafts that are attached to sprockets. Each shaft passes through a tube that terminates with a bearing at the end of the tube. A chain extends from each sprocket through a slot in a wheel frame to an internal multi-gear hub with associated drum brake, which hub is preferably located behind the seat. Each push bar works independently of the other, thereby allowing the user to steer the wheelchair by braking on one hub and propelling on the other. Gears are changed by speed shifters mounted on tubes that are each mounted on left and right extension tubes. Pneumatic or other suitable tires are mounted on rims that are mounted to left and right front forks. Multi-speed hubs are mounted to the rims. The all-terrain wheelchair 10 may be formed with large steel tubing for frames, all joints are preferably welded, the bearings and gearing are preferably sealed, and the plate steel back and seat are preferably welded. As noted, it is be understood that the invention may be made in other ways with other materials and other means of attaching, enclosing and the like.

In operation, a user maneuvers the all-terrain wheelchair 10 as follows. Pulling back on the push bars 28/30 pivots brake levers that, in turn, pull the brake rods so as to effect engagement of the brake. Pushing forward on the push bars 28/30 engages the chain on the sprocket at a selectable gear ratio dependent upon the underlying terrain and the physical capability of the user. The all-terrain wheelchair 10 includes wheelchair foot rests and a back rest that may be adjusted in modifiable increments. The wheelchair frame height may be standard or selectable, and the width of the wheelchair 10 may be adjusted through shortening or lengthening attached cross bars. The all-terrain wheelchair 10 additionally optionally includes one or more accessory receivers, such as gun or fishing rod receptacles.

Advantageous features of the invention include, but may not be limited to the following, all of which distinguish the present invention from commercially available existing manual wheelchairs. First, a substantial mechanical advantage over a range of terrains and activities is provided with the conveniently controllable gearing arrangement and push bars described. Second, gears. Second, the multi-gear rear hubs can be easily engaged while at a standstill—no movement required as with a derailer system. Third, the removable push bars 28/30, either or both of which may be deployed and independently operated, can be used as the drive system as an alternative to conventional hand-to-wheel propulsion. Fourth, the wheelchair 10 allows the user to push forward on the push bars 28/30 to drive the wheelchair 10 forward, and to pull back on those same push bars 28/30 to engage the brake drums.

These features provide, but are not limited to, the following useful advantages for the user. First, the wheelchair 10 provides stability in that it is significantly less likely to tip over than conventional chairs, particularly having a low center of gravity and desirable axle placement through the arrangement of the primary frame 20. Second, the rear wheels 16/18 may be cambered and configured with large, wide, aggressively treaded pneumatic tires, and the front wheels 12 and 14 may be configured with caster tires to aid in movement over varied terrains. Third, the wheelchair 10 may include a stability bar as part of the primary frame 20, which stability bar is attachable to the rear portion of the wheelchair 10 to minimize unintended rearward tipping.

One or more example embodiments to help illustrate the invention have been described. Nevertheless, it will be understood that various modifications may be made without departing from the spirit and scope of the invention. Accordingly, other embodiments are within the scope of the claims appended hereto.

What is claimed is:

1. An all-terrain wheelchair comprising:

a. a primary frame;

b. a right rear wheel frame connected to the primary frame;

c. a left rear wheel frame connected to the primary frame;

d. a right rear wheel including an internally geared hub, the right rear wheel releasably retained in the right rear wheel frame;

e. a left rear wheel including an internally geared hub, the left rear wheel releasably retained in the left rear wheel frame;

f. a right front sprocket coupled to the internally geared hub of the right rear wheel;

g. a left front sprocket coupled to the internally geared hub of the left rear wheel;

h. a right push bar coupled to the right front sprocket and arranged to actuate movement and braking of the right rear wheel; and i. a left push bar coupled to the left front sprocket and arranged to actuate movement and braking of the left rear wheel, wherein the right push bar and the left push bar are independently operable.

2. The all-terrain wheelchair of claim 1 wherein the internally geared hub of the right wheel is a multi-geared hub and the internally geared hub of the left wheel is a multi-geared hub.

3. The all-terrain wheelchair of claim 2 further comprising a right gear shifter coupled to the multi-geared hub of the right rear wheel and a left gear shifter coupled to the multi-geared hub of the left rear wheel.

4. The all-terrain wheelchair of claim 1 wherein the right front sprocket is coupled to the internally geared hub of the right rear wheel by a right chain and the left front sprocket is coupled to the internally geared hub of the left rear wheel by a left chain.

5. The all-terrain wheelchair of claim 1 wherein the right rear wheel frame includes an inside plate and an outside plate, wherein the right front sprocket is coupled to the internally geared hub of the right rear wheel through the outside plate of the right rear wheel frame.

6. The all-terrain wheelchair of claim 5 wherein the left rear wheel frame includes an inside plate and an outside plate, wherein the left front sprocket is coupled to the internally geared hub of the left rear wheel through the inside plate of the left rear wheel frame.

7. The all-terrain wheelchair of claim 1 further comprising:

a. a right front wheel;

b. a left front wheel;

c. a right front wheel coupling bar arranged to couple the right front wheel to the right rear wheel frame; and d. a left front wheel coupling bar arranged to couple the left front wheel to the left rear wheel frame.

8. The all-terrain wheelchair of claim 7 further comprising a right front wheel fork joining the right front wheel to the right front wheel coupling bar, and a left front wheel fork joining the left front wheel to the left front wheel coupling bar.

9. The all-terrain wheelchair of claim 1 wherein the right rear wheel and the left rear wheel include pneumatic tires selected to withstand rough terrain loading.

10. The all-terrain wheelchair of claim 9 wherein the right rear wheel and the left rear wheel are cambered.

11. The all-terrain wheelchair of claim 1 further comprising an accessory tube affixed to the primary frame, wherein the accessory tube is arranged to removably retain therein a selectable one or more accessories.

12. The all-terrain wheelchair of claim 1 wherein the right push bar and the left push bar are removable.

13. The all-terrain wheelchair of claim 1 further comprising a drum brake associated with the internally geared hub of the right rear wheel and a separate drum brake associated with the internally geared hub of the left rear wheel.

14. The all-terrain wheelchair of claim 13 arranged so that the right rear wheel may be rotated or braked independent of the rotation or braking of the left rear wheel.

15. An all-terrain wheelchair comprising:

a. a primary frame;

b. a right rear wheel frame connected to the primary frame;

c. a left rear wheel frame connected to the primary frame;

d. a right rear wheel including an internally geared hub, the right rear wheel releasably retained in the right rear wheel frame;

e. a left rear wheel including an internally geared hub, the left rear wheel releasably retained in the left rear wheel frame;

f. a right front sprocket coupled to the internally geared hub of the right rear wheel;

g. a left front sprocket coupled to the internally geared hub of the left rear wheel;

h. a right push bar coupled to the right front sprocket and arranged to actuate movement and braking of the right rear wheel; and i. a left push bar coupled to the left front sprocket and arranged to actuate movement and braking of the left rear wheel, wherein the right push bar and the left push bar are independently operable, wherein the right rear wheel frame includes an inside plate and an outside plate, wherein the right front sprocket is coupled to the internally geared hub of the right rear wheel through the outside plate of the right rear wheel frame.

16. The all-terrain wheelchair of claim 15 wherein the right rear wheel frame includes an inside plate and an outside plate, wherein the right front sprocket is coupled to the internally geared hub of the right rear wheel through the outside plate of the right rear wheel frame.

* * * * *